US012786189B2

(12) United States Patent
Athias

(10) Patent No.: US 12,786,189 B2
(45) Date of Patent: Nov. 3, 2026

(54) METHOD OF USING WIRELESS COMMUNICATIONS TO MAKE A DETERMINATION

(71) Applicant: Comcast Cable Communications, LLC, Philadelphia, PA (US)

(72) Inventor: Franklyn Athias, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 333 days.

(21) Appl. No.: 14/921,644

(22) Filed: Oct. 23, 2015

(65) Prior Publication Data

US 2017/0118210 A1 Apr. 27, 2017

(51) Int. Cl.

*H04L 29/06* (2006.01)
*H04L 9/40* (2022.01)
*H04W 4/02* (2018.01)
*H04W 12/06* (2021.01)

(52) U.S. Cl.

CPC ...... *H04L 63/0876* (2013.01); *H04L 63/0492* (2013.01); *H04W 4/023* (2013.01); *H04W 12/06* (2013.01)

(58) Field of Classification Search

None

See application file for complete search history.

(56) References Cited

U.S. PATENT DOCUMENTS

| | | | | |
|---|---|---|---|---|
| 8,555,344 B1 * | 10/2013 | Wiedmann | H04W 12/06 | 709/225 |
| 9,900,774 B2 * | 2/2018 | Eramian | H04W 12/08 | |
| 10,419,907 B2 * | 9/2019 | Redding | H04W 4/80 | |
| 10,631,162 B2 * | 4/2020 | Rajadurai | H04L 9/0847 | |
| 10,708,774 B2 * | 7/2020 | Koo | H04W 12/068 | |
| 11,461,747 B1 * | 10/2022 | Thomas | G06Q 20/40155 | |
| 2007/0286138 A1 * | 12/2007 | Kaftan | H04W 28/10 | 726/4 |
| 2008/0137622 A1 * | 6/2008 | Russell | H04L 63/08 | 370/338 |
| 2010/0210239 A1 * | 8/2010 | Karaoguz | H04L 63/102 | 455/411 |
| 2013/0007813 A1 * | 1/2013 | Baskaran | H04N 21/242 | 725/56 |
| 2013/0081113 A1 * | 3/2013 | Cherian | G06F 21/44 | 709/227 |
| 2013/0309971 A1 * | 11/2013 | Kiukkonen | H04W 12/50 | 455/41.2 |
| 2014/0036873 A1 * | 2/2014 | Cheng | H04W 36/0022 | 370/331 |

(Continued)

*Primary Examiner* — Trang T Doan

(74) *Attorney, Agent, or Firm* — Ballard Spahr LLP

(57) ABSTRACT

Methods and systems are disclosed to enable a user device to gain access to a network via a trusted device (e.g., a network device). The network device can obtain a user device identifier from the user device and can transmit the user device identifier along with a network device identifier to a computing device (e.g., a server associated with a service provider). The server can determine if the user device should be permitted to access the network. The server can return the results of the determination to the network device and/or the user device. If the determination is that the user device should be permitted to access the network, the user device can also receive network credentials. The user device can access the network with the network credentials.

25 Claims, 7 Drawing Sheets

(56) References Cited

U.S. PATENT DOCUMENTS

| | | | | |
|---|---|---|---|---|
| 2014/0068719 | A1* | 3/2014 | Kiukkonen | H04W 12/08<br>726/4 |
| 2014/0359740 | A1* | 12/2014 | Yoon | H04W 8/02<br>726/7 |
| 2015/0139210 | A1* | 5/2015 | Marin | H04W 12/50<br>370/338 |
| 2015/0229982 | A1* | 8/2015 | Scott | H04N 21/47214<br>386/296 |
| 2016/0119284 | A1* | 4/2016 | Kim | H04W 12/35<br>726/12 |
| 2016/0241721 | A1* | 8/2016 | Soelberg | H04W 4/24 |
| 2016/0261658 | A1* | 9/2016 | Taylor | H04L 65/4076 |

* cited by examiner

| Address Element 110 | Identifier 118 | Authentication Information 132 |
|---|---|---|
| FF:FF:FF:FF:FF:FF | EE:EE:EE:EE:EE:EE | Login: Admin<br>Password: 1234 |
| DD:DD:DD:DD:DD:DD | EE:EE:EE:EE:EE:EE | Login: Guest<br>Password: 4321 |
| CC:CC:CC:CC:CC:CC | EE:EE:EE:EE:EE:EE | NO ACCESS |

FIG. 2

METHOD OF USING WIRELESS COMMUNICATIONS TO MAKE A DETERMINATION

BACKGROUND

A subscriber can use a user device to access a network. However, user devices need to associate with a network device before the user device is allowed to access the network. Initial association with network devices can be a tedious task. Accordingly, a way to easily connect user devices to a network is needed. These and other shortcomings are addressed by the present disclosure.

SUMMARY

It is to be understood that both the following general description and the following detailed description are exemplary and explanatory only and are not restrictive. Methods and systems are described for discovery, authorization, and/or provisioning of devices on a network. In an aspect, the methods and systems can utilize proximity to trusted devices to provision other devices on a network. A trusted device can be a device that is already attached to the network. In an aspect, a first device (e.g., smart phone, laptop, tablet, etc.) can transmit a first identifier to a second device (e.g., set-top box, modem, router, etc.) using a first messaging protocol, for example, when the first device is detected as being in proximity (e.g., communication range) of the second device. For example, a smart phone can transmit a media access control (MAC) address associated with the smart phone to a set-top box using a Bluetooth messaging protocol. In an aspect, the second device can transmit the identifier of the first device (e.g., first identifier) and an identifier of the second device (e.g., second identifier) to a third computing device. For example, the set-top box can transmit its MAC address and the MAC address of the smart phone to a third computing device (e.g., a server) associated with a service provider. The third computing device can make an authentication decision based on one or more of the first identifier, associated with the first device, and the second identifier, associated with the second device. For example, a server associated with the service provider can make an authentication decision based on one or more of the smart phone's MAC address and the set-top box's MAC address. In an aspect, the third computing device can transmit information to the second device to automatically provision the first device. In another aspect, the third device can transmit information to the second device, which, in turn, can cause a user to be prompted for an authentication decision. For example, the server associated with the service provider can use the MAC address to identify an associated subscriber name, login, or other information. The server can then transmit the associated subscriber name, login, or other information to the set-top box, which, in turn, can cause a display device to display a prompt with options on how to provision the first device. In a further aspect, the options can comprise allowing access to a first network, allowing access to a more limited second network, denying access to the networks, or the like.

In an aspect, the first device can communicate directly with the third device via a communication path that circumvents the second device. For example, the first device can communicate with the third device through a cellular communication path. For example, a smart phone can run an application that enables communication with a server associated with a service provider through a cellular network and can transmit an identifier, such as a MAC address, to the server. In an aspect, the third device can transmit an authentication decision and/or information to the second device, as described above.

In an aspect, the third device can communicate directly with the first device via a communication path that circumvents the second device. For example, the third device can communicate with the first device through a cellular communication path. For example, once the third device makes an authentication decision, the third device can transmit the authentication decision and/or information to the first device. In an aspect, the first device can transmit the authentication information to the second device to initiate network association.

In an aspect, the second device can make an authentication decision based on the identifier received from the first device. In an aspect, the second device can maintain a mapping of identifiers to authentication decisions. For example, a set-top box can receive a MAC address of a smart phone via a Bluetooth communication. The set-top box can make an authentication decision based on the received MAC address. In an aspect, the second device can cause the third device to transmit credentials for network authentication to the first device. In an aspect, the second device can transmit credentials for network authentication to the first device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 is a table in a database of an exemplary system and network;

DETAILED DESCRIPTION

Figure 1:
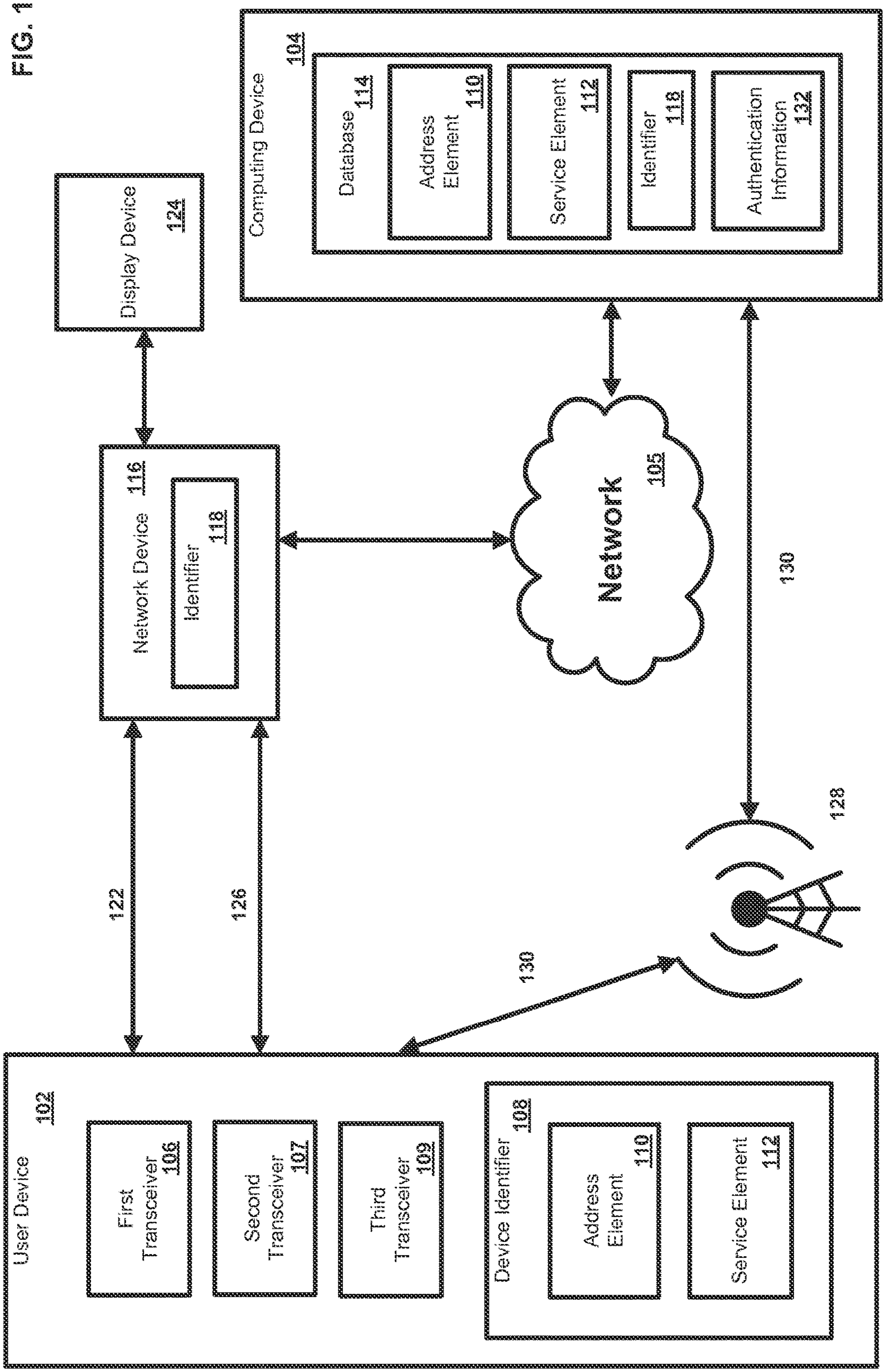
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The following descriptions are exemplary. Methods and systems are described for discovery, authorization, and/or provisioning of devices on a network. In an aspect, the methods and systems can utilize proximity to trusted devices to provision other devices on a network. A trusted device can be a device currently connected to a network. In an aspect, a first device (e.g., smart phone, laptop, tablet, etc.) can transmit a first identifier to a second device (e.g., set-top box, modem, router, etc.) using a first messaging protocol, for example, when the first device is detected as being in proximity (e.g., communication range) with the second device. In an aspect, the proximity of the second device to the first device can be determined by the fact that the second device is close enough to exchange identifiers with the first device. For example, a smart phone can transmit a MAC address associated with the smart phone to a set-top box via a Bluetooth messaging protocol. In an aspect, the second device can transmit the identifier associated with the first device (e.g., first identifier) and an identifier associated with the second device (e.g., second identifier) to a third device. For example, the set-top box can transmit a MAC address associated with the set-top box and the identifier associated with the smart phone to a server associated with a service provider. The third device can make an authentication decision that reflects an authentication of the first device and the second device and a determination of whether or not to authorize access by the second device to the network. The authentication decision can be based on one or more of the first identifier, associated with the first device, and the second identifier, associated with second device. For example, the server associated with the service provider can make an authentication decision based on one or more of the MAC address associated with the smart phone and the MAC address associated with the set-top box. In another aspect, the third device can transmit information to the second device, which, in turn, can cause a user to be prompted for an authentication decision. For example, the server associated with the service provider can use the MAC address associated with the smart phone to identify an associated subscriber name, login, or other information. The server can then transmit the associated subscriber name, login, or other information to the set-top box, which, in turn, can cause a display device to display a prompt with options on how to provision the first device. In a further aspect, the options can comprise allowing access to a first network, allowing access to a more limited second network, denying access to the networks, or the like.

In an aspect, the first device can communicate with the third device via a communication path that circumvents the second device. For example, the first device can communicate to the third device through a cellular communication path. For example, a smart phone can run an application that enables communication with a server associated with a service provider through a cellular network. The smart phone can receive an identifier, such as a MAC address, associated with a set-top box through a WiFi or Bluetooth messaging protocol and can transmit an identifier associated with the set-top box and an identifier associated with the smart phone, such as login information associated with the application, to the server. In an aspect, the third device can transmit an authentication decision and/or information to the second device, as described above.

In an aspect, the second device can make an authentication decision based on the identifier received from the first device. In an aspect, the second device can maintain a mapping of identifiers to authentication decisions. For example, a set-top box can receive a MAC address of a smart phone via a Bluetooth communication. The set-top box can make an authentication decision based on the received MAC address.

In one aspect of the disclosure, a system can be configured to provide services such as network-related services to a user device. FIG. 1 illustrates various aspects of an exemplary environment in which the present methods and systems can operate. The present disclosure is relevant to systems and methods for providing services to a device, for example, a user device such as a computer, tablet, mobile device, communications terminal, or the like.

The network and system can comprise a user device 102 and a computing device 104 such as a server, for example. The computing device 104 can be disposed remotely relative to the user device 102. As an example, the user device 102 and the computing device 104 can be in communication via a private and/or public network 105 such as the Internet or a wide area network. Other forms of communications can be used such as wired and wireless telecommunication channels, for example. In an aspect, the user device 102 can comprise a first transceiver 106. In an aspect, the user device 102 can comprise a second transceiver 107. In an aspect, the user device 102 can comprise a third transceiver 109. In an aspect, the first transceiver 106 can be configured for wired or wireless communication. For example, the first transceiver 106 can be configured for Ethernet communication, such as a Medium Attachment Unit (MAU). In another example, the first transceiver 106 can be configured for WiFi, Bluetooth, cellular, Near Field Communication (NFC), Zigbee, or any other type of communication. In an aspect, the second transceiver 107 can be configured for wired or wireless communication. For example, the second transceiver 107 can be configured for Ethernet communication, such as a MAU. In another example, the second transceiver 107 can be configured for WiFi, Bluetooth, cellular, NFC, Zigbee, or any other type of communication. In an aspect, the third transceiver 109 can be configured for wired or wireless communication. For example, the third transceiver 109 can be configured for Ethernet communication, such as a MAU. In another example, the third transceiver 109 can be configured for WiFi, Bluetooth, cellular, NFC, Zigbee, or any other type of communication.

In an aspect, one or more network devices 116 can be in communication with a network such as the network 105. As an example, one or more of the network devices 116 can facilitate the connection of a device, such as the user device 102, to the network 105. In an aspect, the one or more network devices 116 can be configured to provide various services to one or more devices, such as user devices 102 located at or near a premises. In another aspect, the network devices 116 can be configured to recognize an authoritative device for the premises and/or a particular service or services available at the premises, such as the computing device 104. As an example, an authoritative device, such as the computing device 104, can be configured to govern or enable connectivity to a network such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware. In an aspect, the first transceiver 106 of the user device 102 can facilitate communication with one or more other devices, including the one or more network devices 116 via a first communication path 122. In an aspect, the first communication path 122 can comprise communications using a short-range protocol, such as Bluetooth, Zigbee, or the like. In an aspect, the first communication path 122 can comprise NFC technology. In an aspect, the second transceiver 107 of the user device 102 can facilitate communication with one or more other devices, including the one or more network devices 116 via a second communication path 126. In an aspect, the second communication path 126 can comprise a communication path to the one or more network devices 116 for access to a network, such as the network 105. As a further example, one or more of the network devices 116 can be configured as a wireless access point (WAP). In an aspect, one or more network devices 116 can be configured to allow one or more wireless devices to connect to a wired and/or wireless network using Wi-Fi, Bluetooth or any desired method or standard. In an aspect, the third transceiver 109 of the user device 102 can facilitate communication with one or more other devices via a third communication path 130. In an aspect, the third communication path 130 can comprise communications using a network, such as cellular network 128. In an aspect, an application running on the user device 102 can initiate communication with the computing device 104 via the third communication path 130.

In an aspect, the one or more network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or users. As a further example, the network devices 116 can be configured with a second SSID (e.g., associated with a public/community network or a hidden network) to function as a secondary network or redundant network for connected communication devices.

In an aspect, the one or more network devices 116 can comprise an identifier 118. As an example, one or more identifiers can be or relate to an Internet Protocol (IP) Address IPV4/IPV6 or a MAC address or the like. As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, the one or more network devices 116 can be in direct communication with a display device 124 (e.g., a television, computer monitor, and the like). In an aspect, the one or more network devices 116 can be in indirect communication with the display device 124 through a LAN. In an aspect, the one or more network devices can be one or more of a set-top box, cable modem, wireless router, wired router, or the like.

In an aspect, the user device 102 can be an electronic device such as a computer, a smartphone, a laptop, a tablet, a set top box, a display device, or other device capable of communicating with the network devices 116 and the computing device 104. In an aspect, the user device 102 can be associated with a user identifier or device identifier 108. As an example, the device identifier 108 can be any identifier, token, character, string, or the like, for differentiating one user or user device (e.g., the user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can comprise or provide an internet protocol address, a network address, a MAC address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, the service element 112 can comprise an identification of a service provider associated with the user device 102 and/or with a class of the user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. In an aspect, the computing device 104 can allow the user device 102 to interact with remote resources such as data, devices, and files. As an example, the computing device can be configured as (or disposed at) a central location (e.g., a headend, or processing facility), which can receive content (e.g., data, input programming) from multiple sources. The computing device 104 can combine the content from the multiple sources and can distribute the content to the user device 102.

In an aspect, the computing device 104 can manage the communication between the user device 102 and a database 114 for sending and receiving data therebetween. In an aspect, the computing device 104 can manage the communication between the one or more network devices 116 and the database 114 for sending and receiving data therebetween. As an example, the database 114 can store a plurality of files (e.g., web pages), user identifiers or records, or other information. As a further example, the user device 102 and/or the one or more network devices 116 can request and/or retrieve a file from the database 114. In an aspect, the database 114 can store information relating to the user device 102 such as the address element 110 and/or the service element 112. In an aspect, the database 114 can store information relating to the one or more network devices 116, such as the identifier 118. As an example, the computing device 104 can obtain the device identifier 108 from the user device 102 or the one or more network devices 116 and retrieve information from the database 114 such as the address element 110 and/or the service elements 112. As a further example, the computing device 104 can obtain the address element 110 from the user device 102 or the one or more network devices 116 and can retrieve the service element 112 from the database 114, or vice versa. As a further example, the computing device 104 can receive the device identifier 108 and the identifier 118 from the user device 102 and/or the one or more network devices 116 and can make an authentication decision. The authentication decision can be used by the network device 116 to permit the user device 102 to access network 105. Any information can be stored in and retrieved from the database 114. The database 114 can be disposed remotely from the computing device 104 and accessed via direct or indirect connection. The database 114 can be integrated with the computing system 104 or some other device or system.

In an aspect, the user device 102 can communicate with the network device 116 initially through the first communication path 122. The user device 102 can provide the device identifier 108, comprising the address element 110 to the network device 116 through the first communication path 122 (e.g., via Bluetooth, Ethernet, WiFi, Zigbee, NFC, etc.). In another aspect, the user device 102 can provide the device identifier 108 to the network device 116 through the second communication path 126 (e.g., via Bluetooth, Ethernet, WiFi, Zigbee, NFC, etc.). In an aspect, the network device 116 can then provide the device identifier 108 and the identifier 118 to the computing device 104 through the network 105. In another aspect, the user device 102 can receive the identifier 118 associated with the network device 116, and provide the identifier 118 and the device identifier 108 to the computing device 104 through the third communication path 130. In an aspect, an application running on the user device 102 can initiate communication with the computing device 104 via the third communication path 130. In an aspect, the computing device 104 can make an authentication decision based on the device identifier 108 and the identifier 118 and transmit authentication information 132 to the network device 116 through the network 105. In an aspect, the network device 116 can transmit the authentication information 132 to the user device 102 through the first communication path 122. In another aspect, the computing device 104 can transmit the authentication information 132 to the user device 102 through the third communication path 130. In another aspect, the network device 116 can transmit the authentication information 132 to the user device 102 through the second communication path 126. In another aspect, the network device 116 can permit access to a network (e.g., the network 105, or another network) based on the authentication information 132. In another aspect, the network device 116 can make an authentication decision based on the device identifier 108 provided via the communication path 122 or the second communication path 126. In an aspect, the network device 116 can transmit the authentication information 132 to the user device 102 through the communication path 122, and the user device 102 can initiate association as the user device 102 normally would.

In an aspect, an authentication decision can be based on the device identifier 108. In an aspect, the authentication decision can comprise allowing access if the device identifier 108 appears on a white list (e.g., a list of approved device identifiers). In an aspect, the authentication decision can comprise denying access if the device identifier 108 appears on a black list (e.g., a list of non-approved device identifiers). In an aspect, a user can set up a list of pre-approved device identifiers for a particular network, and the authentication decision can comprise allowing access to the particular network associated with the device identifier 108 if the device identifier 108 is on the list of pre-approved device identifiers. For example, a user can associate a user device (e.g., using an identifier of the user device) with a guest network and the authentication decision can comprise matching the identifier 108 of the user device with a list of identifiers associated with the guest network.

In an aspect, the authentication decision can comprise receiving feedback from a user. For example, a user can be prompted for an authentication decision regarding a user device that is attempting to access the network. In an aspect, the user can respond to the prompt with one or more options, including deny access, grant access to a home (e.g., primary) network, grant access to guest (e.g., secondary) network, add to a pre-approved list, etc. In an aspect, an authentication decision can be based on the identifier 118 of the network device 116. For example, a user can configure the network device 116 to allow access to any user device 102 within range of the network device 116. In an aspect, an access decision can be based on the device identifier 108 and the identifier 118 associated with the network device 116. For example, a user can configure the network device 16 to allow general network access to certain user devices, ban certain user devices, and allow guest access to all other user devices.

FIG. 2 illustrates an exemplary database table associating the address elements 110 and the network device identifiers 118 with the authentication information 132. In the example, a key for the database table comprises an address element 110 and a network device identifier 118. In an aspect, each key can indicate a device (indicated by the address element 110) and a location (indicated by the identifier 118). In an aspect, the authentication information 132 can be associated with each key. In an aspect, the authentication information 132 can comprise an authentication decision based on the device and the location indicated by the key. In an aspect, the authentication information 132 can comprise information to be returned to the user device 102 associated with the address element 110 for authentication. In an aspect, the authentication information 132 can comprise information to be returned to the network device 116 associated with the identifier 118 for authentication. In an aspect, the authentication information 132 can comprise information to be returned to the network device 116 or another device to cause a prompt for feedback from a user on an authentication decision. In an aspect, the authentication information 132 can comprise a binary "yes" or "no" decision. The network device 116 would transmit network credentials to the user device 102 in response to receiving the authentication information 132 comprising a "yes." In an aspect, network credentials can be information (e.g., usernames, passwords, etc.) that allow access to a network device 116.

Returning to FIG. 1, the user device 102 can communicate with the network device 116 initially through the communication path 126. The user device 102 can transmit the device identifier 108, comprising the address element 110 to the network device 116 through the communication path 126. In an aspect, the network device 116 can then transmit the device identifier 108 and the identifier 118 to the computing device 104 through the network 105. In an aspect, the computing device 104 can look up authentication information 132 associated with the address element 110 and the identifier 118. In an aspect, the computing device 104 can transmit the authentication information 132 to the network device 116 through the network 105. In an aspect, the network device 116 can authenticate the user device 102 through the communication path 122 or the communication path 126. In an aspect, the network device 116 can transmit the authentication information 132 to the user device 102 through the communication path 122 or the communication path 126, and the user device 102 can initiate network association.

Figure 3:
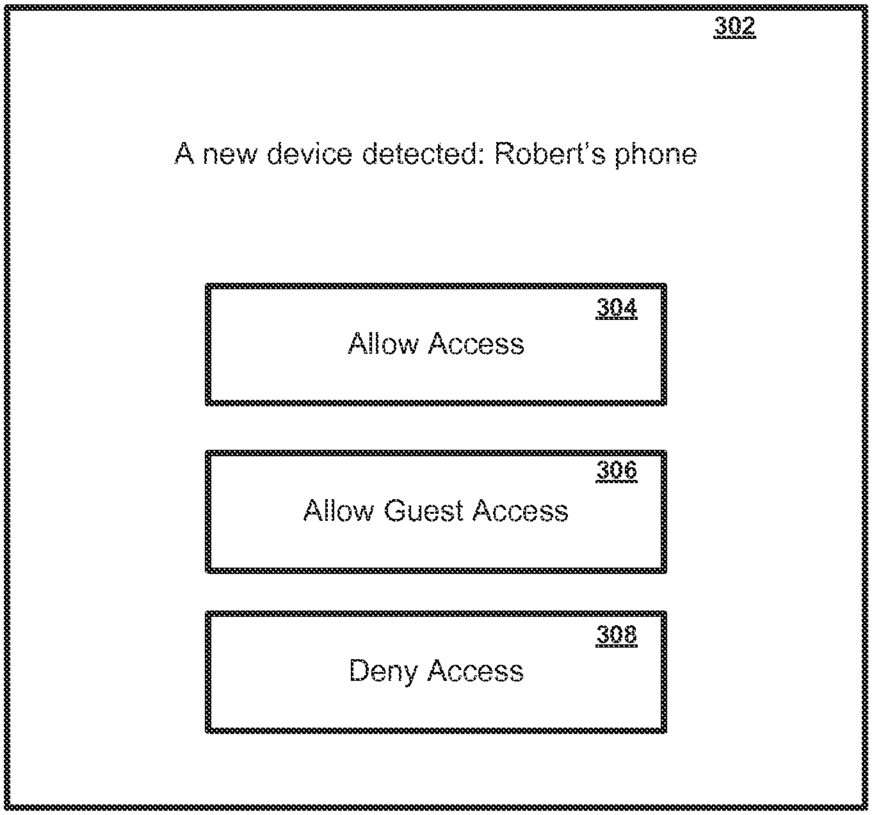
FIG. 3 is a user interface of an exemplary system and network.

FIG. 3 illustrates a user interface 302 capable of being used in conjunction with the methods and systems described herein. In an aspect, the user interface 302 can be displayed on a display device 124 in response to detection of a new user device 102 by a network device 116. In an aspect, the new user device 102 can communicate with the network device 116 initially through the first communication path 122 or the second communication path 126, as explained above. The new user device 102 can transmit the device identifier 108, comprising the address element 110 to the network device 116 through the communication path 122. In an aspect, the network device 16 can then transmit the device identifier 108 and the identifier 118 to the computing device 104 through the network 105. In another aspect, the user device 102 can receive the identifier 118 from the network device 116 and transmit the identifier 118 and the device identifier 108 to the computing device 104 through the third communication path 126, as explained above. In an aspect, the computing device 104 can retrieve authentication information 132 based on the device identifier 108 and the identifier 118 and transmit the authentication information 132 to the network device 116 at the premises indicated by the identifier 118 through the network 105. For example, the authentication information 132 can comprise a subscriber name and a device name, as illustrated in FIG. 3. The authentication information 132 can comprise any other information. In an aspect, the network device 116 can cause the user interface 302 to a display device 124 at the premises to update with a request for feedback and receive feedback from a user. In an aspect, the user can select from a variety of options. In an aspect, the options can comprise allowing access to a primary network 304, allowing access to a guest network 306, denying access 308, and the like. In an aspect, the network device 116 can communicate with the display device 124 through a local area network. In an aspect, the network device 116 in communication with the display device 124 can receive a selection from the user and can implement the selection by allowing the user device 102 access to a network as guided by the selection.

In an aspect, the network device 116 in communication with the display device 124 receives a selection from the user and transmits the selection to the computing device 104. In an aspect, a decision concerning the authentication information 132 to be used for the new user device 102 can be made locally by the network device 116 or devices in communication with the network device 116. In another aspect, the selection can be provided to the computing device 104 for a decision concerning the authentication information 132 to be used for the new user device 102. In an aspect, credentials can be transmitted from the computing device 104 to the user device 102 via the third communication path 130.

In an aspect, after authentication, the network device 116 can allow access to a network. In an aspect, the network established can depend on the authentication information 132 associated with the identifier 118 and address element 110. In an aspect, after network is established, the user device 102 can communicate with other devices, such as the computing device 104, through the network established via the second communication path 126 with the one or more network devices 116. In an aspect, the first communication path 122 can use a first messaging protocol and the second communication path 126 can use a second messaging protocol. In an aspect, the first messaging protocol can be a relatively short-range messaging protocol and the second messaging protocol can be a relatively long-range messaging protocol. In an aspect, the relatively short-range messaging protocol can be Bluetooth and the relatively long-range messaging protocol can be Wi-Fi. The second communication path 126 can facilitate communications with a chosen network, such as the network 105.

Figure 4:
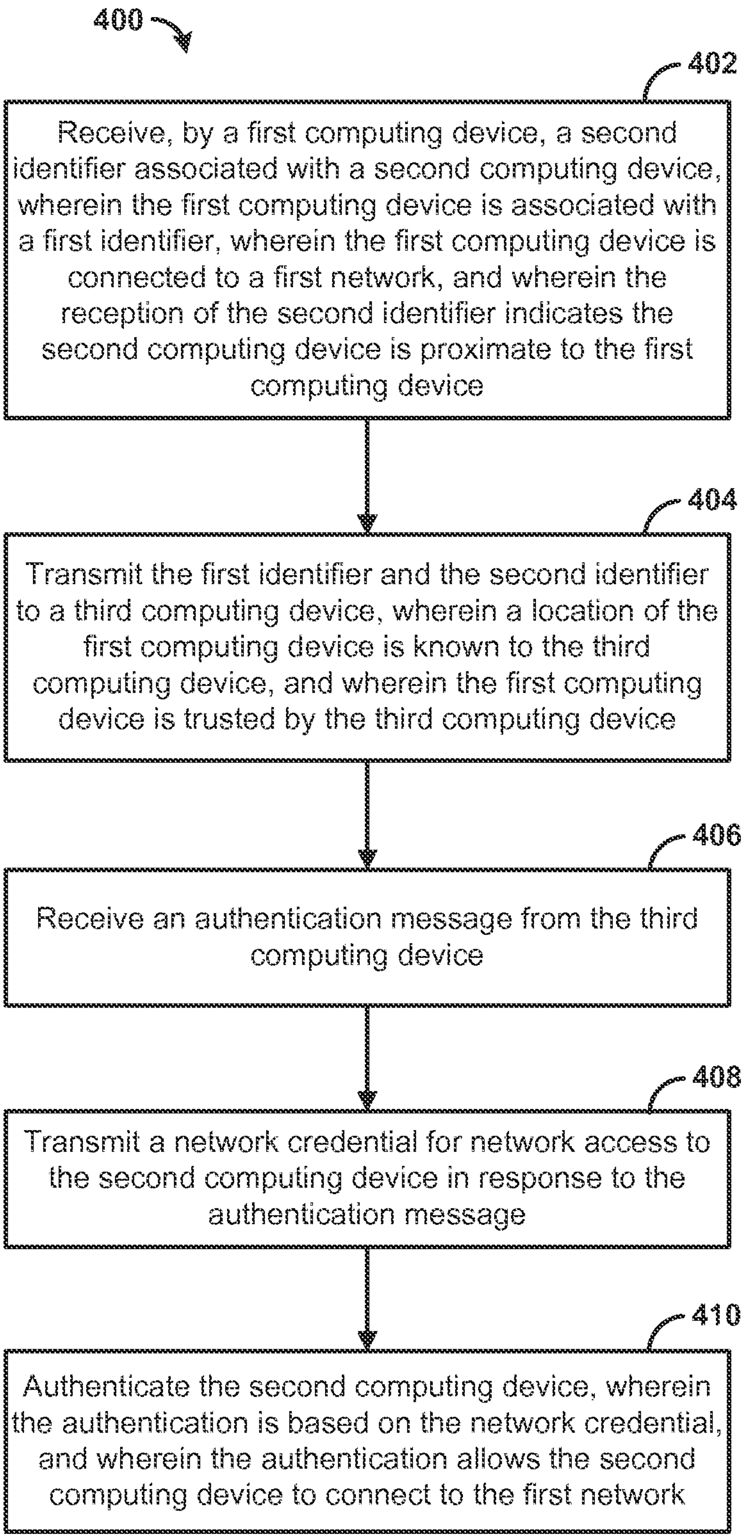
FIG. 4 is a flow chart of an exemplary method.

FIG. 4 illustrates an exemplary method 400 executable on a network device 116 to implement the systems and methods described herein. In step 402, a second identifier associated with a second computing device can be received by a first computing device. In an aspect, the first computing device can be associated with a first identifier. In an aspect, the first computing device can be connected to a first network. In an aspect, the reception of the second identifier can indicate the second computing device is proximate to the first computing device. For example, the method by which the second identifier is received may be completed only if the second computing device is proximate to the first computing device. In an aspect, the first and/or second identifier can be a MAC address. In an aspect, the first and/or second identifier can be a NFC ID. In an aspect, the first and/or second identifier can be associated with subscription information. In an aspect, the first and/or second identifier can be any combination of the foregoing or a unique signature generated based on any combination of the foregoing. In an aspect, the second identifier can be received via the first communication path 122. In an aspect, the second identifier can be received via the second communication path 126. For example, a router can receive a MAC address from a smart phone. In an aspect, the router can receive the MAC address via a Bluetooth communication from the smart phone. In an aspect, the router can receive the MAC address via a Wi-Fi communication from the smart phone.

In step 404, the first identifier and the second identifier can be transmitted to a third computing device. In an aspect, a location of the first computing device can be known to the third computing device. In an aspect, the first computing device can be trusted by the third computing device. In an aspect, the third computing device can trust the second computing device in response to the second computing device being proximate to the first computing device. In an aspect, the third computing device can be one or more servers associated with a service provider. In an aspect, the first and second identifiers can be transmitted over the Internet to the third computing device. For example, the router can transmit the MAC address of the smart phone and the MAC address of the router to the service provider's server. In an aspect, the first identifier can be associated with a location.

In step 406, an authentication message can be received from the third computing device. In an aspect, the authentication message can be a determination of whether the second computing device should be allowed access. In an aspect, the authentication message can be login credentials. In an aspect, the authentication message can be based on the second identifier. Optionally, the authentication message can be based on the first identifier. In an aspect, the authentication message can be based on a combination of two or more of: a subscriber, a user, a device, and a location. In an aspect, an authentication message can be an NFC pairing.

In step 408, a network credential for network access can be transmitted to the second computing device in response to the authentication message. Optionally, network access based on the network credential can be provided to the second computing device. In an aspect, the network access can be to the first network. In an aspect, the network access can be to a second network. In an aspect, the network credential for the network access can be transmitted to the second computing device based on the authentication message can comprise causing a display device to prompt a user for feedback. In an aspect, the network credential for the network access can be transmitted to the second computing device based on the authentication message can comprise receiving feedback from the user. In an aspect, the network credential for the network access can be transmitted to the second computing device based on the authentication message can comprise transmitting the network credential based on the received feedback.

In step 410, the second computing device can be authenticated based on the network credential. In an aspect, the authentication can allow the second computing device to connect to the first network. In an aspect, the first computing device can authenticate the second computing device based on the network credential. In an aspect, the network credential can be transmitted to the second computing device via the first communication path 122 or the second communication path 126, and authentication can happen as normal.

Figure 5:
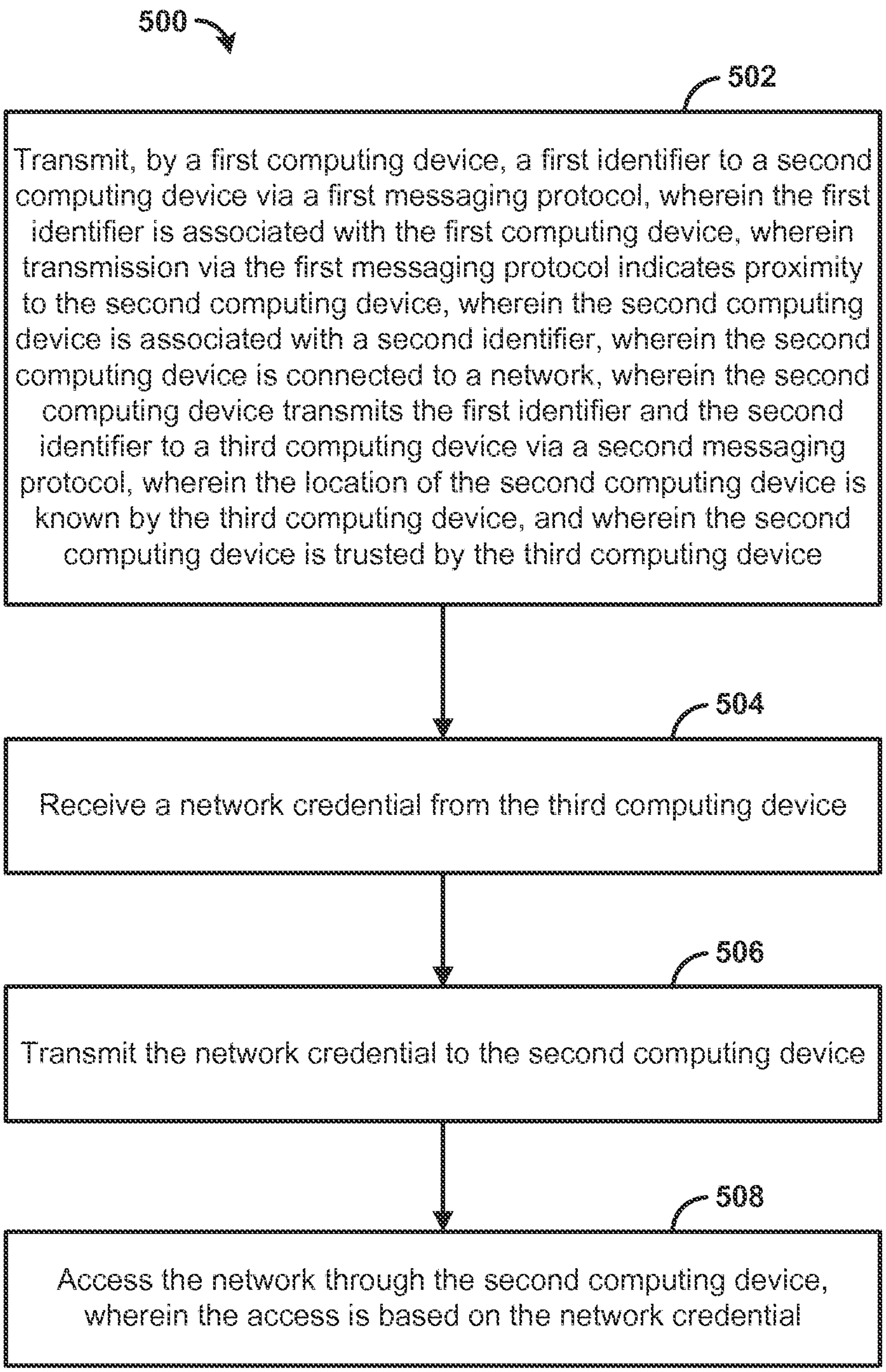
FIG. 5 is a flow chart of an exemplary method.

FIG. 5 illustrates an exemplary method 500 executable on an incoming user device 102 to implement the systems and methods described herein. In step 502, a first computing device can transmit a first identifier to a second computing device via a first messaging protocol. In an aspect, the first identifier can be associated with the first computing device. In an aspect, transmission via the first messaging protocol can indicate proximity to the second computing device. For example, the first messaging protocol may only work if the second computing device is proximate to the first computing device. In an aspect, the second computing device can be associated with a second identifier. In an aspect, the second computing device can be connected to a network. In an aspect, the second computing device can transmit the first identifier and the second identifier to a third computing device via a second messaging protocol. In an aspect, the first messaging protocol can comprise communication via a Bluetooth standard. In an aspect, the first messaging protocol can accommodate NFC communications. In an aspect, the second messaging protocol can comprise communication via a Wi-Fi standard. In an aspect, the second messaging protocol can accommodate NFC communications. In an aspect, the second computing device can be one or more of: a gateway, an access point, a set-top box, a router, and a television. In an aspect, the first computing device can be one or more of: a smart phone, a tablet, and a laptop computer. In an aspect, the location of the second computing device can be known to the third computing device. In an aspect, the second computing device can be trusted by the third computing device. In an aspect, the third computing device can trust the first computing device in response to the first computing device being proximate to the second computing device.

In step 504, a network credential can be received from the third computing device. In an aspect, the network credential can be based on subscription information associated with the first computing device. In an aspect, the subscription information can be determined at least in part by the first identifier. In an aspect, the subscription information can be determined at least in part by the second identifier. In an aspect, the subscription information can comprise login information, personal information, account information, and the like. In an aspect, login information can comprise a user name, a password, and the like. In an aspect, personal information can comprise a name, an address, and the like. In an aspect, account information can comprise a service subscribed to, a class of the service subscribed to, and the like. In an aspect, the network credential can be received directly from the third computing device via the third communication path 130. In an aspect, the network credential can be received indirectly from the third computing device via the second computing device. In an aspect, the network credential can be received from the second computing device via the first communication path 122 or the second communication path 126.

In step 506, the network credential can be transmitted to the second computing device. In an aspect, the network credential can correspond to a primary network. In an aspect, the network credential can correspond to a guest, or secondary network.

In step 508, the network can be accessed through the second computing device. In an aspect, the access can be based on the network credential. Optionally, the first computing device can communicate via the second messaging protocol through the accessed network. In an aspect, the network accessed can be different from a network accessed by a fourth computing device, wherein the fourth computing device is in association with the second computing device.

Figure 6:
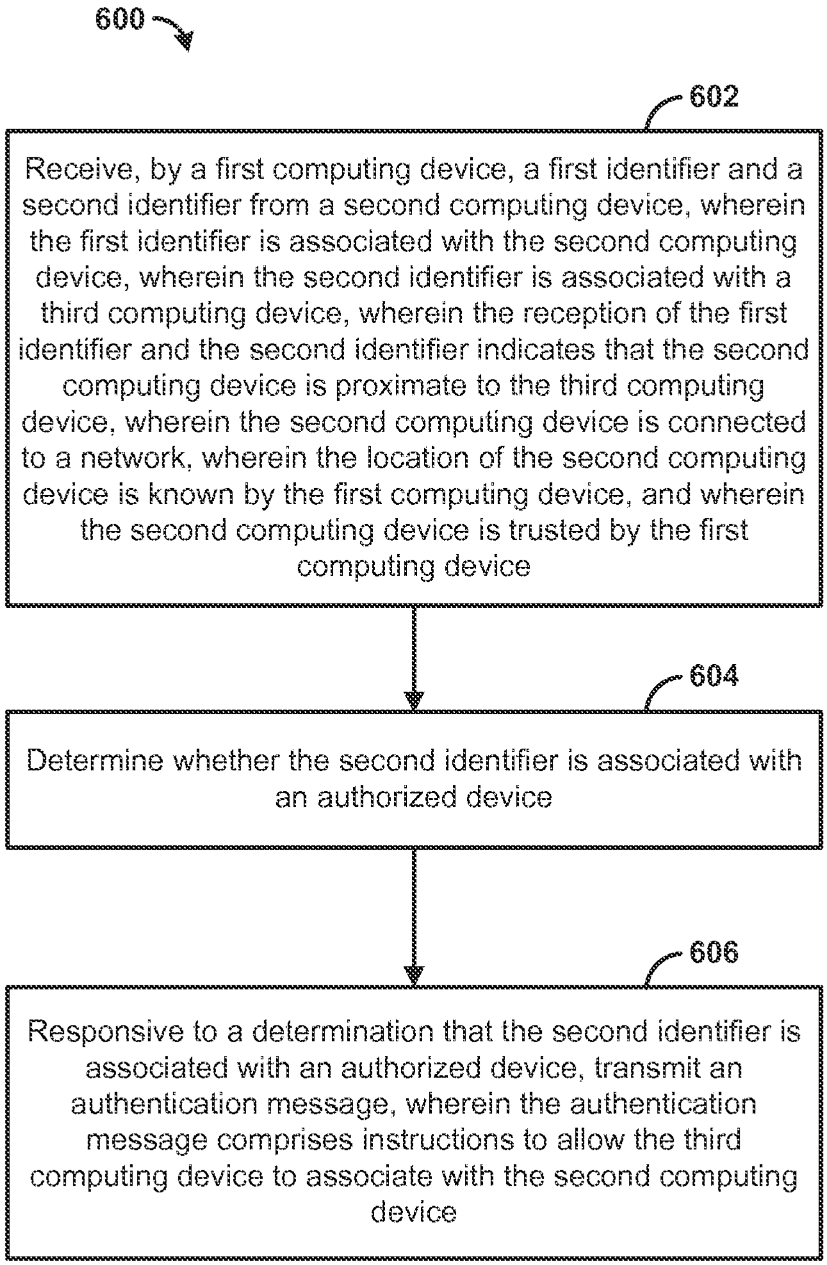
FIG. 6 is a flow chart of an exemplary method.

FIG. 6 illustrates an exemplary method 600 executable on a computing device 104 to implement the systems and methods described herein. In step 602, a first computing device can receive a first identifier and a second identifier from a second computing device. In an aspect, the first identifier can be associated with the second computing device. In an aspect, the second identifier can be associated with a third computing device. In an aspect, the first and/or second identifier can comprise a MAC address. In an aspect, the first and/or second identifier can be a NFC ID. In an aspect, the first and/or second identifier can be associated with subscription information. In an aspect, the first and/or second identifier can be any combination of the foregoing or a unique signature generated based on any combination of the foregoing. In an aspect, the reception of the first identifier and the second identifier can indicate that the second computing device is proximate to the third computing device. For example, the method by which the first identifier and/or the second identifier are received may be completed only if the second computing device is proximate to the third computing device. In an aspect, the second computing device can be connected to a network. In an aspect, the location of the second computing device can be known by the first computing device. In an aspect, the second computing device can be trusted by the first computing device. In an aspect, the first computing device can trust the third computing device in response to the second computing device being proximate to the third computing device.

In step 604, a determination can be made whether the second identifier is associated with an authorized device. Optionally, determining if the second identifier is associated with an authorized device can comprise retrieving subscription information associated with the second and/or first identifier. In an aspect, the subscription information can comprise login information, personal information, account information, and the like. In an aspect, login information can comprise a user name, a password, and the like. In an aspect, personal information can comprise a name, an address, and the like. In an aspect, account information can comprise a service subscribed to, a class of the service subscribed to, and the like. In an aspect, the second identifier can comprise a phone number. In a further aspect, the second identifier can comprise a phone number from which a short message service (SMS) was sent. In an aspect, the second identifier can comprise a code. In a further aspect, the second identifier can comprise a code generated by an application.

In step 606, responsive to a determination that the second identifier is associated with an authorized device, an authentication message can be transmitted. In an aspect, the authentication message can comprise instructions to allow the third computing device to associate with the second computing device. In an aspect, the authentication message can be transmitted in response to determining that the second identifier is associated with an authorized device. Optionally, transmitting the authentication message based on the authentication decision can comprise causing a display device to prompt a user for a selection of a plurality of options for an access decision for the third computing device. In an aspect, the plurality of options can comprise deny, allow, and allow with limited access. In an aspect, the plurality of options can comprise a plurality of networks.

Figure 7:
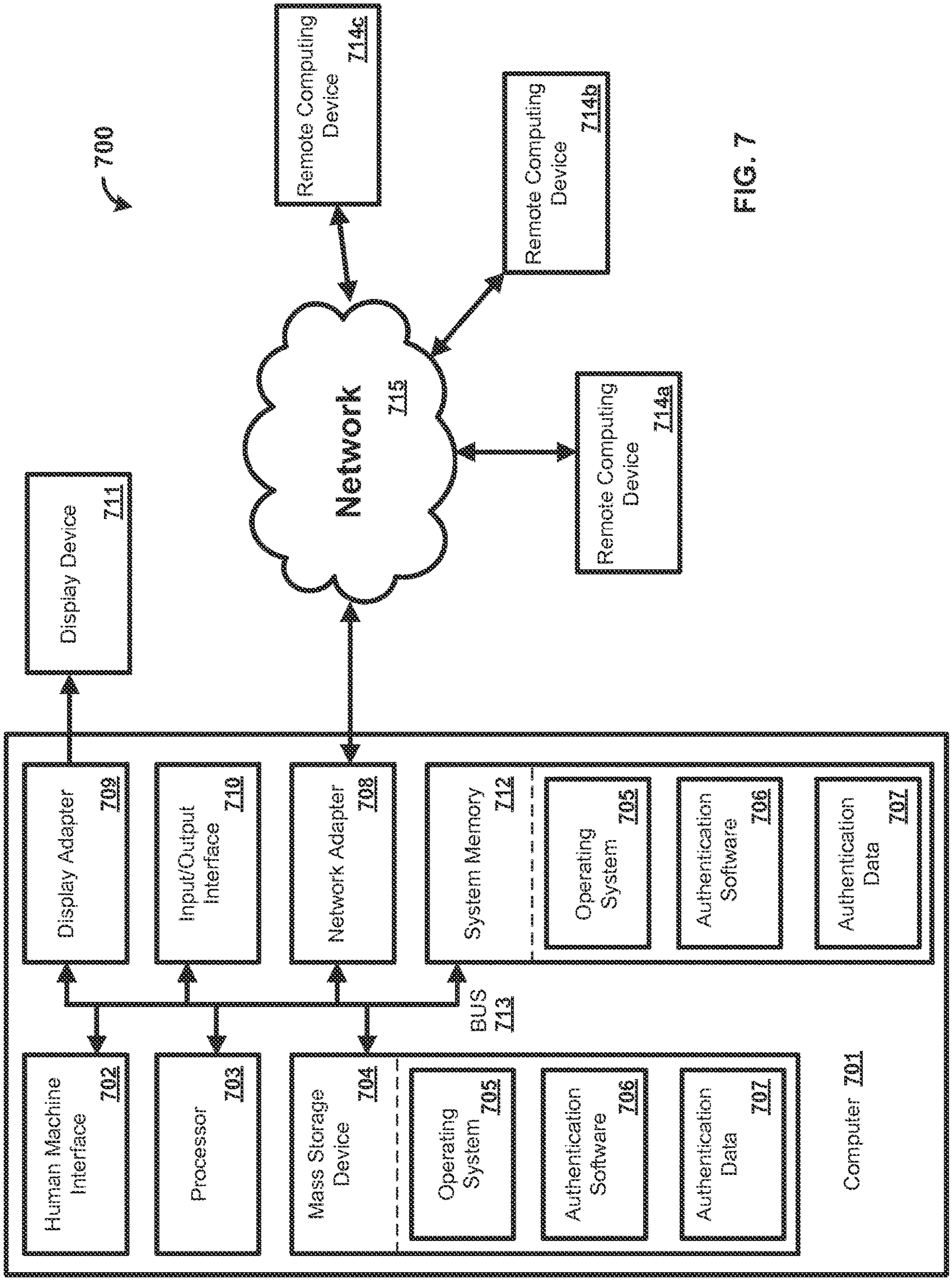
FIG. 7 is a block diagram of an exemplary computing device.

In an exemplary aspect, the methods and systems can be implemented on a computer 701 as illustrated in FIG. 7 and described below. By way of example, the computing device 104 of FIG. 1 can be a computer 701 as illustrated in FIG. 7. Similarly, the methods and systems disclosed can utilize one or more computers to perform one or more functions in one or more locations. FIG. 7 is a block diagram illustrating an exemplary operating environment 700 for performing the disclosed methods. This exemplary operating environment 700 is only an example of an operating environment and is not intended to suggest any limitation as to the scope of use or functionality of operating environment architecture. Neither should the operating environment 700 be interpreted as having any dependency or requirement relating to any one or combination of components illustrated in the exemplary operating environment 700.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 701. The computer 701 can comprise one or more components, such as one or more processors 703, a system memory 712, and a bus 713 that couples various components of the computer 701 including the one or more processors 703 to the system memory 712. In the case of multiple processors 703, the system can utilize parallel computing.

The bus 713 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and one or more of the components of the computer 701, such as the one or more processors 703, a mass storage device 704, an operating system 705, authentication software 706, authentication data 707, a network adapter 708, system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 can comprise computer readable media in the form of volatile memory, such as random access memory (RAM), and/or non-volatile memory, such as read only memory (ROM). The system memory 712 typically can comprise data such as the authentication data 707 and/or program modules such as the operating system 705 and the authentication software 706 that are accessible to and/or are operated on by the one or more processors 703.

In another aspect, the computer 701 can also comprise other removable/non-removable, volatile/non-volatile computer storage media. The mass storage device 704 can provide non-volatile storage of computer code, computer readable instructions, data structures, program modules, and other data for the computer 701. For example, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the authentication software 706. One or more of the operating system 705 and the authentication software 706 (or some combination thereof) can comprise elements of the programming and the authentication software 706. The authentication data 707 can also be stored on the mass storage device 704. The authentication data 707 can be stored in any of one or more databases known in the art. Examples of such databases comprise, DB2®, Microsoft®. Access, Microsoft® SQL Server, Oracle®, mySQL, PostgreSQL, and the like. The databases can be centralized or distributed across multiple locations within the network 715.

In another aspect, the user can enter commands and information into the computer 701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 703 via a human machine interface 702 that is coupled to the bus 713, but can be connected by other interface and bus structures, such as a parallel port, game port, an IEEE 1394 Port (also known as a Firewire port), a serial port, a network adapter 708, and/or a universal serial bus (USB).

In yet another aspect, a display device 711 can also be connected to the bus 713 via an interface, such as a display adapter 709. It is contemplated that the computer 701 can have more than one display adapter 709 and the computer 701 can have more than one display device 711. For example, the display device 711 can be a monitor, an LCD (Liquid Crystal Display), light emitting diode (LED) display, television, smart lens, smart glass, and/or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display 711 and the computer 701 can be part of one device, or separate devices.

The computer 701 can operate in a networked environment using logical connections to one or more remote computing devices 714*a,b,c*. By way of example, a remote computing device 714*a,b,c* can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 701 and a remote computing device 714*a,b,c* can be made via a network 715, such as a LAN and/or a general wide area network (WAN). Such network connections can be through a network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components can reside at various times in different storage components of the computing device 701, and are executed by the one or more processors 703 of the computer 701. An implementation of the authentication software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:

receiving, by a network device associated with a first identifier and from a user device, a message comprising a second identifier associated with the user device, wherein the message indicates that the user device is within a communication range of the network device;

based on the user device being within the communication range of the network device, sending, by the network device, to a computing device, a request to authenticate the user device, wherein the request comprises the first identifier and the second identifier, and wherein the network device is authenticated with the computing device; and receiving, by the network device from the computing device, based on the network device being authenticated with the computing device, authentication information for the user device.

2. The method of claim 1, further comprising:

causing, by the network device, output of an option associated with allowing the user device access to a network, wherein the option associated with allowing the user device access to the network comprises one or more options to allow the user device full access to the network, to allow the user device limited access to the network, or to deny the user device access to the network.

3. The method of claim 1, wherein the network device comprises one or more of a set-top box, an access point, or a gateway device, and the user device comprises one or more of a smart device phone, a mobile device, or a personal computing device.

4. The method of claim 1, further comprising receiving, by the network device from the user device, a network access request, wherein the network access request comprises a network credential.

5. The method of claim 1, receiving, based on subscription information, the authentication information, wherein the subscription information comprises one or more of account information, login information, a subscribed service, or a class of subscribed service.

6. The method of claim 1, wherein the network device being authenticated with the computing device comprises one or more of the network device being trusted by the computing device, the network device being an authorized device, or the network device being a previously authenticated device.

7. The method of claim 1, wherein the network device comprises a set-top box, and the method further comprises receiving, by a gateway device from the user device, a network access request, wherein the network access request comprises a network credential.

8. The method of claim 1, wherein the authentication information comprises one or more of a username, a password, a name, or an address.

9. The method of claim 1, wherein the user device is authenticated based on a location of the user device being known to the computing device.

10. The method of claim 1, further comprising:
based on a user input indicating allowing the user device access to a network, sending, by the network device to the user device, a network credential configured to allow the user device to access the network.

11. A method comprising:
sending, by a user device, to a network device, a message comprising an identifier associated with the user device, wherein the message indicates that the user device is within a communication range of the network device; and
based on the user device being within the communication range of the network device, receiving, by the user device from the network device, a network credential configured to allow the user device access to a network, wherein the network device is authenticated with a computing device.

12. The method of claim 11, wherein the network device comprises a set-top box and the method further comprises sending, by the user device to a gateway device, a request to access the network, wherein the request comprises the network credential.

13. The method of claim 11, further comprising sending by the user device to the network device, a request to access the network, wherein the request comprises the network credential.

14. The method of claim 11, further comprising receiving an indication of a selection of an option output by the network device indicating allowing the user device access to the network, wherein the option output by the network device indicating allowing the user device access to the network comprises one or more options to allow the user device full access to the network, to allow the user device limited access to the network, or to deny the user device access to the network.

15. The method of claim 11, wherein the message comprising the identifier associated with the user device, is sent via a first messaging protocol comprising one or more of a protocol complying with a short message service (SMS) standard or a short-range communication technique, and the network credential is received via a second messaging protocol comprising a protocol complying with a long-range communication technique.

16. The method of claim 11, receiving, based on subscription information, the network credential, wherein the subscription information comprises one or more of account information, login information, a subscribed service, or a class of subscribed service.

17. The method of claim 11, wherein the network device comprises one or more of a set-top box, an access point, or a gateway device.

18. The method of claim 11, wherein the user device comprises one or more of a smart device, a mobile device, or a personal computing device.

19. The method of claim 11, wherein the identifier associated with the user device is sent to the network device from the user device based on the user device being within the communication range of the network device.

20. The method of claim 11, wherein the network credential is received based on subscription information, wherein the subscription information is configured to indicate the user device is authenticated with the computing device.

21. The method of claim 11, further comprising: receiving an indication of a selection of an option output by the network device, wherein the option is configured to allow the user device to access the network.

22. A method comprising:
receiving a first identifier associated with a network device and a second identifier associated with a user device, wherein the second identifier indicates that the user device is within a communication range of the network device;
determining, based on the first identifier, that the network device is authenticated;
based on the user device being within the communication range of the network device, receiving, from the network device, a request to authenticate the user device; and
based on the network device being authenticated, sending, to the network device, authentication information for the user device.

23. The method of claim 22, further comprising receiving, from the network device, based on a selection indicating allowing the user device access to a network, a network credential configured to allow the user device to access the network.

24. The method of claim 22, further comprising:
determining the second identifier is associated with subscription information, wherein the subscription information comprises one or more of account information, login information, a subscribed service, or a class of subscribed service.

25. The method of claim 22, wherein the authentication information causes the network device to output an option associated with allowing the user device to access a network.

* * * * *